United States Patent
Crook

(10) Patent No.: US 6,464,775 B2
(45) Date of Patent: Oct. 15, 2002

(54) FAST-SETTING, FIBROUS, PORTLAND CEMENT-BASED BUILDING MATERIAL

(76) Inventor: Dennis Maq Crook, 2840 Strasburg Rd., East Fallowfield, PA (US) 19320

( * ) Notice: Subject to any disclaimer, the term of this patent is extended or adjusted under 35 U.S.C. 154(b) by 0 days.

(21) Appl. No.: 09/767,167

(22) Filed: Jan. 22, 2001

(65) Prior Publication Data

US 2001/0045179 A1 Nov. 29, 2001

Related U.S. Application Data

(60) Provisional application No. 60/177,766, filed on Jan. 24, 2000.

(51) Int. Cl.⁷ ............................................. C04B 18/26
(52) U.S. Cl. ........................ 106/731; 106/690; 106/691; 106/805; 264/333
(58) Field of Search ................................ 106/731, 805, 106/690, 691; 264/333

(56) References Cited

U.S. PATENT DOCUMENTS

| | | | |
|---|---|---|---|
| 4,339,405 A | 7/1982 | Paszner | 264/108 |
| 4,486,234 A | 12/1984 | Herr | 106/18.14 |
| 4,592,966 A | 6/1986 | Prior et al. | 428/689 |
| 4,604,318 A | 8/1986 | Prior et al. | 428/289 |
| RE32,329 E | 1/1987 | Paszner | 264/108 |
| 4,721,659 A | 1/1988 | Tieckelmann et al. | 428/701 |
| 4,731,265 A | 3/1988 | Hirao et al. | 427/440 |
| 4,734,133 A | 3/1988 | Sherif et al. | 106/85 |
| 4,755,227 A | 7/1988 | Sherif et al. | 106/85 |
| 5,002,610 A | 3/1991 | Sherif et al. | 106/691 |
| 5,019,170 A | 5/1991 | Walter et al. | 106/805 |
| 5,194,087 A | 3/1993 | Berg | 106/18.12 |
| 5,314,744 A | 5/1994 | Walter et al. | 428/326 |
| 5,657,597 A | * 8/1997 | Loftus | 52/274 |
| 5,772,751 A | 6/1998 | Nisnevich et al. | 106/679 |
| 5,846,894 A | 12/1998 | Singh et al. | 501/155 |

OTHER PUBLICATIONS

Literature from www.faswall.com web site regarding Faswall Technology. KX Industries, Inc., Windsor, SC Jan. 11, 2000.

"The Zakarra Plan" by Dennis C. Crook, *bad PRESS*, University of Wales Swansea, Student Union, Singleton Park1, Swansea, SA 2 8PP, p. 21, Jun. 12, 1995.

* cited by examiner

*Primary Examiner*—Anthony Green
(74) *Attorney, Agent, or Firm*—Woodard, Emhardt, Naughton, Moriarty & McNett

(57) ABSTRACT

A fast-setting, fibrous, Portland Cement-based building material is made by soaking wood chips in water to provide substantially saturated wood chips, combining the saturated wood chips with a slurry of Portland cement to provide a wood chip/cement slurry, mixing a slurry of monomagnesium phosphate ("MOP") with the wood chip/cement slurry to provide a quick-setting MOP/wood chip/cement composition, and compressing the quick-setting MOP/wood chip/cement composition to make the fast-setting, fibrous, Portland Cement-based building material. The inventive composition combines the best properties of cement and wood, yet uses recycled materials to make an environmentally-friendly building material.

1 Claim, No Drawings

FAST-SETTING, FIBROUS, PORTLAND CEMENT-BASED BUILDING MATERIAL

This application claims the benefit of U.S. Provisional Application No. 60/177,766, filed Jan. 24, 2000.

FIELD OF THE INVENTION

The present invention relates generally to building materials, and more particularly to an environmentally-friendly building material that combines the strength and durability of concrete, with the sawability, nailability, and screwability of wood.

BACKGROUND TO THE INVENTION

One challenge facing the world today is how to balance the demand for new construction materials with environmental concerns caused by the extensive use of wood. To address that challenge, "green" building technologies are being developed that use renewable or recycled resources in place of traditional materials.

One aspect of these green building technologies is the avoidance of new wood or whole wood sheeting. As is known to the art, the manufacture of whole wood sheeting creates large amounts of waste as the whole tree is under-utilized. Moreover, wood is flammable, making wood construction less safe than its non-flammable alternatives.

One alternative to wood is concrete masonry products, such as concrete blocks or bricks. These products are generally fireproof, but are difficult to use in many applications because they cannot easily be sawed, and cannot easily accept nails or screws. Special water-cooled concrete saws are normally required to cut concrete, and concrete anchors are generally needed to use nails or screws in concrete.

It can be seen from the above that a need exists for a new building material that: (1) uses renewable or recycled raw materials; (2) is fireproof; (3) can be sawed with conventional saws; and (4) can accommodate conventional nails and/or screws. The present invention addresses that need.

SUMMARY OF THE INVENTION

Briefly describing one aspect of the present invention, there is provided a method for making a fast-setting, fibrous, Portland cement-based building material. The material is preferably made by:

(a) combining absorbent fibers (preferably wood chips) with water to provide substantially saturated fibers;

(b) combining the saturated fibers with an aqueous slurry of Portland cement to provide a fiber/cement slurry;

(c) combining the fiber/cement slurry with an aqueous solution of monomagnesium phosphate ("MOP") and allowing the fiber/cement/MOP mixture to begin reacting; and (d) compressing the fiber/cement/MOP mixture as it "sets" to provide a fibrous, Portland Cement-based building material.

One object of the present invention is to provide a superior building material that combines the advantages of cement and wood.

Another object of the present invention is to make a superior building material from cement and recycled wood.

Other objects and advantages will be apparent from the following description.

DESCRIPTION OF THE PREFERRED EMBODIMENT

For the purpose of providing a further understanding of the principles of the invention, reference will now be made to preferred embodiments and specific language will be used to describe the same. It will nevertheless be understood that no limitation of the scope of the invention is thereby intended. All alterations, modifications, and further applications of the principles of the invention, whether preferred or not, are intended to be within the scope of the invention as broadly defined.

As indicated above, the present invention combines a water-absorbent fibrous material (such as wood chips) with Portland cement to make a fiber/cement slurry, and then combines the fiber/cement slurry with a fast-setting binding agent such as monomagnesium phosphate ("MOP") to make a cementitious material. The cementitious material can be used in essentially any way that other building materials, such as wood or cement blocks, are used. Building blocks and fence posts are among the most preferred commercial embodiments.

The invention finds particular advantage in its ability to use recycled or waste wood chips as the fiber material. In some less preferred embodiments, new or recycled paper may be used in addition to, or as a replacement for, the wood chips. Alternatively, other synthetic or natural water-absorbent fillers may be used to supplement or replace the wood or paper fibers, although those embodiments are less preferred in testing to date. (For the remainder of this disclosure, wood chips will generally be used as the water-absorbent fiber material. It is to be understood though, that other fibers could be used as noted above.)

The wood chips or other water-absorbent fibrous material is preferably sized between "mulch"-sized chips and wood "shavings." Most commonly, a majority of the wood chip material is provided by chips that are between about 0.50" and 1.50" in length (12 to 38 mm), with chips between 0.50" and 1.0" long being more preferred. Similarly, a substantial portion of the wood chip material is provided by chips that are between about 0.125" to 0.50" thick (3 to 12 mm), with chips between 0.125" and 0.25" thick being more preferred. Lastly, a substantial portion of the wood chip material is provided by chips that are between about 0.125" to 1.0" wide (3 to 25 mm), with chips between 0.25" and 0.50" wide being more preferred. Pieces within or near those size ranges are generally large enough to provide structural integrity to the finished product, yet small enough to be held firmly in the cement/MOP matrix. The appropriate size will depend somewhat on the fiber material being used, the consistency of the cement and the MOP, and the end use for the finished product.

Further as to wood chip size, while it is appreciated that the particles may be of various sizes, a substantial volume of the fibers should be large enough to grip and/or hold a nail or screw when penetrated. Preferably, the pieces are large enough that at least 25% of the volume of the chips can be compressed by 50% when penetrated by a nail or screw, thus allowing for tight penetration.

Although in some embodiments dry fibers are used, in the most preferred embodiments the fibers are soaked in water before being added to the cement. It is believed that soaking fills the spaces in the fibers with water, and allows the cement/MOP matrix to more easily enter and fill those spaces. When pre-soaking is used, it should be for a time sufficient to substantially saturate the wood chips (or other fibers), with 50–100% saturation being preferred, 60–95% saturation being more preferred, and 70–90% saturation being most preferred.

After soaking, the fibrous material is preferably drained to remove any residual water—particularly water that remains on the surface of the material. It is not necessary that the surface of the saturated material be dry, but it is preferred that the amount of water surrounding (as opposed to within) the fibrous material be minimized. Generally, it is preferred that the wood chips or other fibers be wet, but not dripping wet. In certain embodiments though (and particularly when less water is used in the Portland cement slurry that is combined with the fibers) dripping wet fibers can be used.

While the wood chips or other fibers are soaking or draining the Portland cement slurry can be prepared. Generally, the Portland cement slurry is prepared by combining dry Portland cement with water at a ratio of between about 1:1 to 4:1 (cement:water). In the most preferred embodiment a ratio of about 2:1 (cement:water) is used. The cement slurry is mixed until smooth, as is known to the art.

When the "saturated" fibers and the cement slurry are both ready, the two components are mixed together to make a wet cement/fiber mixture. Preferably, the ratio of wet fiber to wet cement in the cement/fiber mixture is between about 1:2 and 1:4 (weight-to-weight), with 1:3 being most preferred. The components are mixed until the wood chips or other fibers are well coated.

In an alternative embodiment the cement slurry is made by adding dry cement and water to the saturated wood chips and mixing thoroughly to make the cement/wood chip slurry. This embodiment eliminates the need to add the wood chips to the cement slurry after the slurry is mixed.

As to the binding agent, monomagnesium phosphate ("MOP") is most preferred in testing to date. The MOP is mixed with water, with a ratio of about 2:1 (MOP:water) being preferred for most applications. In alternative applications MOP:water ratios may vary from 4:1 to about 1:1.

When the MOP is initially combined with the water, the MOP particles do not immediately go into solution. Accordingly, the MOP and water are preferably mixed for several minutes (preferably between about 20 and 40 minutes) until the MOP and water combine to form a "creamy" solution. It is this well-mixed MOP/water preparation that is combined with the cement/fiber slurry prepared above.

As previously indicated, the material of the present invention is prepared by mixing the MOP/water preparation with the cement/fiber slurry. The mixing serves to ensure that the components are fairly evenly distributed, and proceeds until the MOP begins to "react" with the fiber/cement slurry. The reaction is exothermic, so the mixing may be stopped when the mixture begins to get warm and "set."

The last step in the preparation of the inventive material is the compression step. In this step the material is "pressed" with a force of at least about 50 psi, most preferably in a mold to shape the product. In the most preferred embodiments the material is pressed using a force of between about 200 and 2000 psi.

It is to be appreciated that the cementitious material is substantially fireproof, much as conventional cement is. It is also to be appreciated that the cementitious material has properties that are not possessed by conventional cement. For example, the cementitious material is sawable (can be sawed with a conventional saw), and nailable (can be nailed with conventional nails), much as wood is. Moreover, screws can be used without the anchors required by conventional concrete.

Reference will now be made to specific examples using the processes described above. It is to be understood that the examples are provided to more completely describe preferred embodiments, and that no limitation to the scope of the invention is intended thereby.

EXAMPLE 1

A 4" by 4" by 1½" block is prepared as follows. First, soak ½ lb. of "dry" wood chips in water overnight or until substantially saturated. Then, drain the excess water from the mixture. In a separate container, combine 1 lb. dry Portland cement with ½ lb. water. Mix to make a cement slurry. Add the wet fibers to the cement slurry and mix thoroughly until all the particles of the fiber are coated with the slurry. The mixture will feel sticky, and you will not feel any grain.

While the fiber/cement slurry is mixing, combine ¼ lb. monomagnesium phosphate ("MOP") with ⅛ lb. water. Mix gently for 20–30 minutes, or until the MOP starts to feel warm. The consistency of the MOP mixture will also become thick and creamy.

When the MOP has reacted with the water to become warm, add it to the fiber/cement slurry. Mix quickly and thoroughly, and place in a mold if a specific shape is desired. The mixture will start to harden quickly, and can be pressed into desired shapes and/or dimensions during hardening.

EXAMPLE 2

A 4" by 4" by 1½ block is prepared as follows. First, soak ½ lb. of recycled paperboard and/or cardboard (cut into small pieces the size of wood chips) in water overnight or until substantially saturated. Then, drain the excess water from the mixture. In a separate container, combine 1 lb. dry Portland cement with ½ lb. water. Mix to make a cement slurry. Add the wet fibers to the cement slurry and mix thoroughly until all the particles of the fiber are coated with the slurry. The mixture will feel sticky, and you will not feel any grain.

While the fiber/cement slurry is mixing, combine ¼ lb. monomagnesium phosphate ("MOP") with ⅛ lb. water. Mix gently for 20–30 minutes, or until the MOP starts to feel warm. The consistency of the MOP mixture will also become thick and creamy.

When the MOP has reacted with the water to become warm, add it to the fiber/cement slurry. Mix quickly and thoroughly, and place in a mold if a specific shape is desired. The mixture will start to harden quickly, and can be pressed into desired shapes and/or dimensions during hardening.

While the invention has been illustrated and described in detail in the foregoing description, the same is to be considered as illustrative and not restrictive in character, it being understood that only the preferred embodiments have been shown and described, and that all changes and modifications that come within the spirit of the invention are desired to be protected.

I claim:

1. A method for making a cementitious material, said method comprising:
   (a) combining wood chips with water to provide substantially saturated wood chips;
   (b) combining said substantially saturated wood chips with an aqueous slurry of Portland cement to provide a wood chip/cement slurry;
   (c) combining the wood chip/Portland cement slurry with an aqueous solution of monomagnesium phosphate to create a fiber/cement/monomagnesium phosphate mixture, and allowing the fiber/cement/ monomagnesium phosphate mixture to begin reacting; and
   (d) compressing the fiber/cement/monomagnesium phosphate mixture before it finishes setting to provide a fibrous, Portland cement-based building material.

* * * * *

UNITED STATES PATENT AND TRADEMARK OFFICE
CERTIFICATE OF CORRECTION

PATENT NO. : 6,464,775 B2
DATED : October 15, 2002
INVENTOR(S) : Crook, Dennis M. and Siti M.

It is certified that error appears in the above-identified patent and that said Letters Patent is hereby corrected as shown below:

<u>Title page,</u>
Item [76], Inventors, should read -- Dennis Maq Crook and Siti M. Crook --

Signed and Sealed this

Eighteenth Day of March, 2003

JAMES E. ROGAN
*Director of the United States Patent and Trademark Office*